(No Model.)

B. S. BOYLES.
SPADE OR SHOVEL HANDLE.

No. 304,067. Patented Aug. 26, 1884.

Witnesses.

Inventor.
Benjamin S. Boyles
per Merriam & Whipple
Attorneys.

UNITED STATES PATENT OFFICE.

BENJAMIN S. BOYLES, OF WINAMAC, INDIANA, ASSIGNOR OF ONE-HALF TO JOHN G. BOYLES, OF SAME PLACE.

SPADE OR SHOVEL HANDLE.

SPECIFICATION forming part of Letters Patent No. 304,067, dated August 26, 1884.

Application filed December 10, 1883. (No model.)

*To all whom it may concern:*

Be it known that I, BENJAMIN S. BOYLES, of Winamac, in the county of Pulaski and State of Indiana, have invented certain new and useful Improvements in Spade or Shovel Handles, of which the following is a specification.

The invention consists in an attachment for the handles of spades or shovels, to be arranged and secured thereto for the purpose of facilitating the use of the foremost hand of the operator in forcing the shovel into the ground and also in lifting the load. The same is especially useful in ditching, and will be found convenient in other uses.

The accompanying drawings illustrate the invention.

Figure 1:
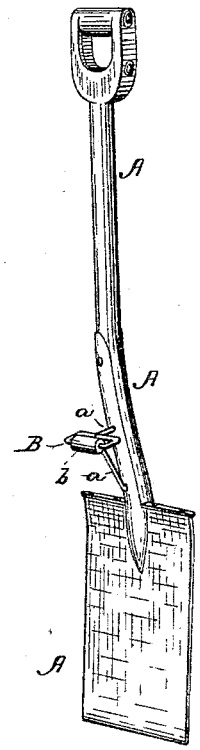
Figure 2:
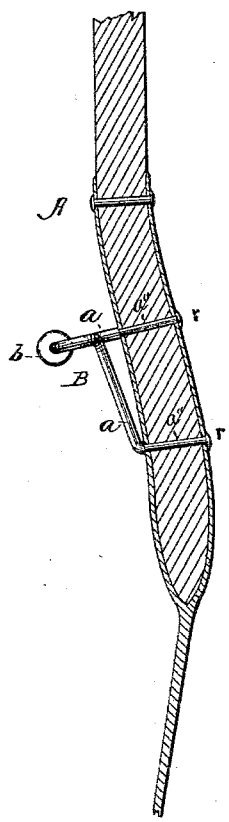
Figure 3:
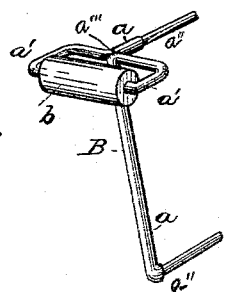

Figure 1 is a perspective view of a spade provided with the attachment. Fig. 2 is an enlarged longitudinal section through portions of the handle and blade. Fig. 3 is an enlarged perspective view of the attachment detached from the handle.

A designates the spade and its handle, which are of the usual construction.

B is the attachment. It consists of a wire or small rod, $a$, bent, as at $a'\,a'$, to form a loop or narrow opening for the hand, and having the parts $a''\,a''$. The loop is provided with a handle, $b$, which is put onto the wire before it is bent to form the loop. The width of the loop below handle $b$ is just sufficient to allow the fingers to pass freely under in taking hold of said handle. At the point $a'''$, where the wire meets, it should be welded or fastened together to give strength. The parts $a''\,a''$ are made and adapted in their distance apart and position to be inserted into the two lower rivet-holes, $r\,r$, in the handle and straps of the spade, the rivets first being taken out. As the spade or shovel is usually constructed, these holes are of a uniform distance apart and uniform in size, and the attachment is made to correspond thereto and fit into the same. By cutting off the heads of the two rivets mentioned and driving them out, the parts $a''\,a''$ may be readily inserted in their place and clinched, and thus be made to serve the purpose of the removed rivets in holding the straps to the handle, and also secure the attachment in place. Any ordinary mechanic can so attach it.

The position and location of the handle $b$ with reference to the spade-handle must be essentially substantially that shown in the drawings. It must be transverse of the spade-handle, in order to facilitate the use of the foremost hand in forcing the shovel into the ground. It must also be braced and secured in this position, so as to resist the strain required by this operation. It must also be close down upon the spade-handle and at the right place thereon to effect this result. The lower part of the loop $a'\,a'$ should be on a line with or below the top of the straight part of the handle, as indicated by the line $x\,x$, Fig. 2, so that handle $b$ will be nearly in line with or but slightly above the top of the straight part of the shovel-handle, and the handle $b$ should be about in the position of the central rivet with reference to the length of the shovel-handle.

It is the intention to furnish the attachment, as shown, separate from the handle of the shovel or spade, and ready to be attached in the manner shown, as well as to furnish the shovel or spade with the same attached.

I am aware that an attachment to a shovel-handle is shown in United States Patent No. 120,607, of November 7, 1871, to Frank Alsip; but this has the same general course as the shovel-handle, and no advantage is thereby given to the foremost hand in pushing the shovel into the ground over what it would have in taking hold of the shovel-handle itself. The attachment so arranged is not my invention.

I am also aware that various lifting devices for the handles of shovels and spading-forks have been patented heretofore having the attached handle arranged transversely of the shovel-handle, but being of such different construction, location on the shovel-handle, and attachment thereto from mine as to afford no other capacity than that of lifting the load, and not intended to push or facilitate the pushing of the shovel into the ground, which is the purpose of mine, as well as to lift the load.

The lifting devices above referred to and disclaimed are found in United States patents to Gardner, April 6, 1875, No. 161,678; to Wheat, February 5, 1867, No. 61,784; to Beal, March 5, 1867, No. 62,594, and to Parsons, June 25, 1867, No. 66,196.

Having thus described my invention, what I claim is—

The handle attachment B, consisting of the brace-rod $a\ a$, looped as at $a'\ a'$, and having the handle $b$, and the parts $a''\ a''$, constructed and arranged substantially as described.

BENJAMIN S. BOYLES.

Witnesses:
W. B. BURSON,
W. H. HOFFMAN.